United States Patent
D'Hers et al.

(10) Patent No.: US 7,970,735 B2
(45) Date of Patent: Jun. 28, 2011

(54) CROSS VARYING DIMENSION SUPPORT FOR ANALYSIS SERVICES ENGINE

(75) Inventors: Thierry D'Hers, Redmond, WA (US); Bala Atur, Redmond, WA (US); Marius Dumitru, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 11/384,676

(22) Filed: Mar. 20, 2006

(65) Prior Publication Data

US 2007/0219957 A1 Sep. 20, 2007

(51) Int. Cl.
*G06F 7/02* (2006.01)
*G06F 17/30* (2006.01)
*G06F 15/02* (2006.01)

(52) U.S. Cl. ........ 707/603; 707/607; 707/713; 707/718; 707/957; 712/12

(58) Field of Classification Search ............... 707/3, 2, 707/6, 999.002, 999.003, 999.006, 601, 603, 707/713, 718, 776; 712/12

See application file for complete search history.

(56) References Cited

U.S. PATENT DOCUMENTS

| | | | |
|---|---|---|---|
| 5,905,985 | A | 5/1999 | Malloy et al. |
| 5,918,232 | A | 6/1999 | Pouschine et al. |
| 6,233,573 | B1 | 5/2001 | Bair et al. |
| 6,282,532 | B1 | 8/2001 | Sandell |
| 6,397,195 | B1 | 5/2002 | Pinard et al. |
| 6,553,366 | B1 | 4/2003 | Miller et al. |
| 6,574,619 | B1 | 6/2003 | Reddy et al. |
| 6,631,361 | B1 | 10/2003 | O'Flaherty et al. |
| 2003/0061225 | A1 | 3/2003 | Bowman et al. |
| 2003/0225752 | A1* | 12/2003 | Bakalash et al. ................. 707/3 |
| 2005/0076045 | A1 | 4/2005 | Stenslet et al. |
| 2006/0271505 | A1* | 11/2006 | Vierich et al. .................... 707/2 |

FOREIGN PATENT DOCUMENTS

WO WO2005008596 1/2005

OTHER PUBLICATIONS

Tresch, M., et al.; "Schema Transformation without Database Reorganization," SIGMOD Record, vol. 22, No. 1, Mar. 1993, (7 pages).
Yao, et al.; "A Dynamic Database Reorganization Algorithm," ACM Transactions on Database Systems, vol. 1. No. 2, Jun. 1976, pp. 159-174.
Cheng, et al.; "Effective Clustering of Complex Objects in Object-Oriented Databases," 1991 ACM, (pp. 22-31).
"Clarity Consolidation," © Clarity Systems 2005, (2 Pages).
Markowitz, et al.; "Incremental Reorganization of Relational Databases," Proceedings of the 13th VLDB Conference, Brighton 1987, (9 pages).

* cited by examiner

*Primary Examiner* — James Trujillo
*Assistant Examiner* — Bruce M Moser
(74) *Attorney, Agent, or Firm* — Workman Nydegger (57) ABSTRACT

A data processing and analysis system is provided. The system includes an analysis engine that queries one or more components of data. A rules component specifies a relationship between at least one dimension of the data with respect to at least one other dimension of the data in order to facilitate an analysis of the data. In one example, the analysis engine is provided as an online analytical processing component.

19 Claims, 11 Drawing Sheets

CROSS VARYING DIMENSION SUPPORT FOR ANALYSIS SERVICES ENGINE

BACKGROUND

On Line Analytical Processing or OLAP is a term that is generally applied to applications that perform multidimensional analysis which facilitates data or information to be viewed and manipulated in a more intuitive manner. For instance, in a business application, OLAP users can observe a set of corporate data in many different forms without expending great software design resources. This behavior is facilitated via OLAP files or cubes that model data in multiple dimensions. A dimension is the classification of some activity in an organization or other structure with which one can measure a parameter such as a goal or business success. For example, users can track sales data against product or customer data over a given period of time.

Generally, there are two types of dimensions that applications can employ, regular dimensions and measures dimensions. Regular dimensions refer to the items of data that users desire to measure, for example, if an application was designed to control sales one could use: Customers: with such example questions as which customers are the best buyers?, where are they located?, what do they buy? etc.; and Products: regarding customers, what are the customers buying? which products are selling the best? and so forth. Another dimension includes time, such as where do these products stand now with respect to last year or last month? In another application, account receivables could employ dimensions such as time to track the due date of receivables, where in other accounting areas dimensions such as charts of accounts, cost center issues and so forth may also be considered.

Measures dimensions are the numbers that appear in the analysis depending on the elements chosen from the regular dimensions. For example in a sales cube, one may want to track revenue, cost, units sold, discounts, and so forth. When such data has been collected, the data may be assigned to a highly sophisticated structure referred to as a multidimensional cube, where the cube can reside in a specialized database or as a standalone file. The cube allows users to observe data in a plurality of different forms. Thus, applications can cross all the respective dimensions of the cube to obtain new information which hopefully should answer questions that users may be searching for.

In general, there are two basic operations that can be performed with an OLAP cube which includes Slicing and Dicing. Users can change the dimensions they are looking at to have another view of data. For example, Sales by product can be changed easily to Sales by salesman. Slicing is to change the value of a dimension for another value—for example, change from sales of January to sales of February. Dicing is similar to throwing a dice or die and looking for a new face of the cube. Drilling is another term where data items can be drilled down to get more information. For instance, if an application were to look at geographical data, users can drill down from a region to a country and then to a city and then to a customer to observe information at greater detail.

Generally, in OLAP modeling, the extent of what is referred to as "cube space" is entirely and uniquely determined by how dimensions are defined. This may have several negative consequences including:

1. Members from different dimensions are completely independent, not allowing the cube author to specify any kind of business rule correlations that span physical dimension boundaries.

2. It is possible that non-null values get assigned to member combinations from different dimensions that logically cannot coexist and cannot have meaning for the business scenario being modeled.

3. The number of cells in the cube space is artificially increased, leading to performance degradation for queries.

One possible way to offset the above drawbacks with an OLAP product or tool is to forcefully merge such cross-varying correlated dimensions into a single dimension, which however introduces new problems. These problems include losing the strong cohesion that business or other type users have associated with attributes in a single dimension, and altering the navigation behavior through side effects of overwrite semantics between attributes that conceptually used to belong to different dimensions.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

An analysis engine is provided to facilitate data analysis and data processing. A rules component is employed with the analysis engine to enable specifications of data dimensions that define one or more relationships between one or more data dimensions, where such dimensions can be associated with a data cube (or cubes), for example. By specifying such relationships, data can be viewed and processed in a meaningful, rich environment that dynamically provides and processes data in its correct context to the user's application while mitigating the need to merge data in an unnatural manner such as forcing the data into a single dimension.

In one specific example, the analysis engine enables developers to build a dimension (A) and define that it is varying based on another dimension (B), for example. The system can thus automatically handle multiple versions of dimension A based on dimension members of Dimension B. In this manner, users can now query data for a specific version of Dimension A based on dimension B members requested in a query. They can also request for a same Dimension B member data value for multiple different versions of Dimension A. As can be appreciated, dimension relationships can be specified between one dimension to a plurality of dimensions or specify relationships between a dimension subset with respect to at least one other dimension subset.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A data processing and analysis system is provided. The system includes an analysis engine that queries one or more components of data. A rules component specifies a relationship between at least one dimension of the data with respect to at least one other dimension of the data in order to facilitate an analysis of the data. In one example, the analysis engine is provided as an online analytical processing component, where a graphical user interface can specify the relationship and be employed to view the data. The data can be associated with one or more cubes of data which are processed by the engine.

As used in this application, the terms "component," "engine," "model," and the like are intended to refer to a computer-related entity, either hardware or computer executable components stored on memory. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
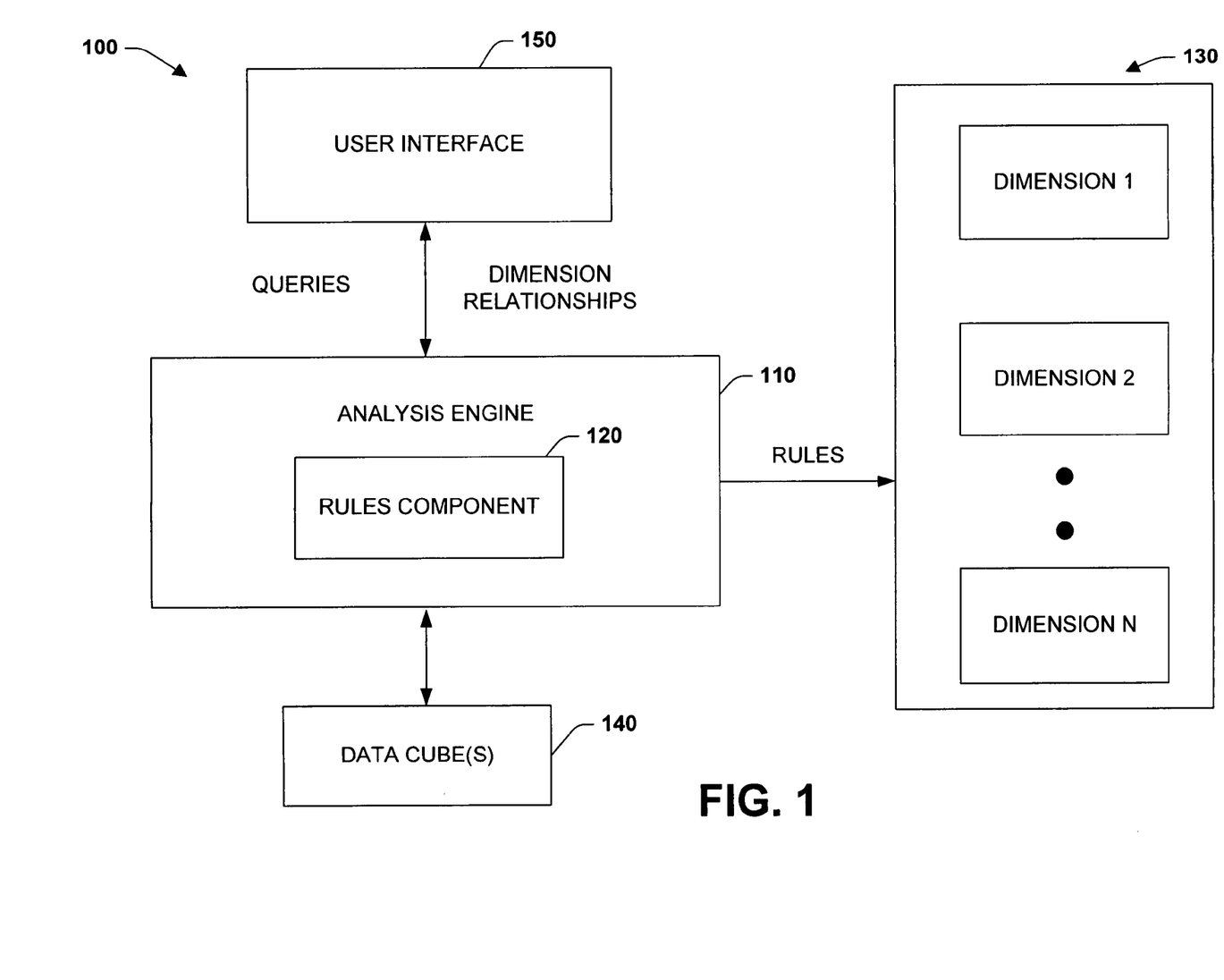
FIG. 1 is a schematic block diagram illustrating a data processing and analysis system.

Referring initially to FIG. 1, a data processing and analysis system 100 is illustrated for dynamically processing and viewing data in desired data contexts which are relevant to a given user. The system 100 includes an analysis engine 110 (can also be referred to as an online analysis or analytical processing engine) having a rules component 120 for specifying one or more data dimension relationships at 130. Such dimensions 130 are generally associated with one or more data cubes 140 which are stored on local or remote databases (not shown). A graphical user interface 150 is provided to enable users to submit queries to the analysis engine 110 and to allow rules to be specified for the rules component 120. In general, rules can be applied between dimensions, between one dimension and a subset of dimensions, and/or rules applied between one dimension subset and one or more other dimension subsets at 130. It is also noted that the analysis engine 110 could be provided as part of a tool such as an online analytical processing (OLAP) tool however, other type applications are possible such as data modeling applications, for example.

In one specific example of how the rules operates on the dimensions 130, the analysis engine 110 enables developers to build a dimension (A) and define that it is varying based on another dimension (B), for example. The system 100 can thus automatically process multiple versions of dimension A based on dimension members of Dimension B. In this manner, users can query data via the user interface 150 for a specific version of Dimension A based on dimension B members requested in a query. They can also request for a same Dimension B member data value for multiple different versions of Dimension A. As can be appreciated, dimension relationships can be specified at 130 between one dimension to a plurality of dimensions or specify relationships between a dimension subset with respect to at least one other dimension subset.

Various applications can be supported by the system 100 ranging from data modeling on one hand to more routine applications dealing with business and finance, for example. In one case, the system 100 allows a user to define which member of the dimension 130 are valid for a specific entity, or even which combination of tuples (dimension member for several distinct dimension) are valid. For instance, a specific Entity X may only deal with Product A or Product B, while Entity Y may only deal with Product B and Product C. Accordingly, each Entity owner should be able to set rules via the rules component 120 and user interface 150 that Product C is not relevant for Entity X and Product A is not relevant for Entity Y. For this example, with reporting tools associated with the user interface 150, a Product C will not appear in a product list when the Entity is set to Entity X.

In a business example, data and dimensions 130 are often not symmetrical where they change over time, where time is a dimension 130 associated with the data. For instance, a product categorization changes over time or a company organization changes over time. Many organizations re-organize several times per year. In a company, the chart of accounts often varies by divisions and so forth. A plurality of dimension changes can be similarly specified based on values in other dimensions. By specifying dimension relationships in this manner, the analysis engine 110, can efficiently process a plurality of applications. Cross varying dimensions help support reorganizations where reorganization is a component of a budget in an enterprise. Thus, during periods of reorganization, data relationships change and old models no longer reflect current data structures and organizations.

With respect to reorganization, the analysis engine 110 supports various data processing and viewing including: moving an entity under another parent as of a specified day or time; splitting entity cost Centers/Headcount/Line items; merging entities; ceasing entity activities such as selling the entity; starting new business division/acquiring a new entity; changing percentage of ownership; and changing owner. As can be appreciated a plurality of other aspects can affect a business and require change among data dimension relationships at 130.

In addition to various hardware and/or software components provided with the system 100, various interfaces can be provided to manipulate and query data. This can include a Graphical User Interface (GUI) 150 to interact with the model or other components of the engine 110 such as any type of application that sends, retrieves, processes, and/or manipulates data, receives, displays, formats, and/or communicates data, and/or facilitates operation of the application. For example, such interfaces can also be associated with an engine, server, client, editor tool or web browser although other type applications can be utilized.

The user interface 150 can include a display (not shown) having one or more display objects (not shown) for manipulating and viewing data including such aspects as configurable icons, buttons, sliders, input boxes, selection options, menus, tabs and so forth having multiple configurable dimensions, shapes, colors, text, data and sounds to facilitate operations with the analysis engine 110. In addition, the interface 150 can also include a plurality of other inputs or controls for adjusting and configuring one or more aspects. This can include receiving user commands from a mouse, keyboard, speech input, web site, remote web service and/or other device such as a camera or video input to affect or modify operations of the interface 150.

Figure 2:
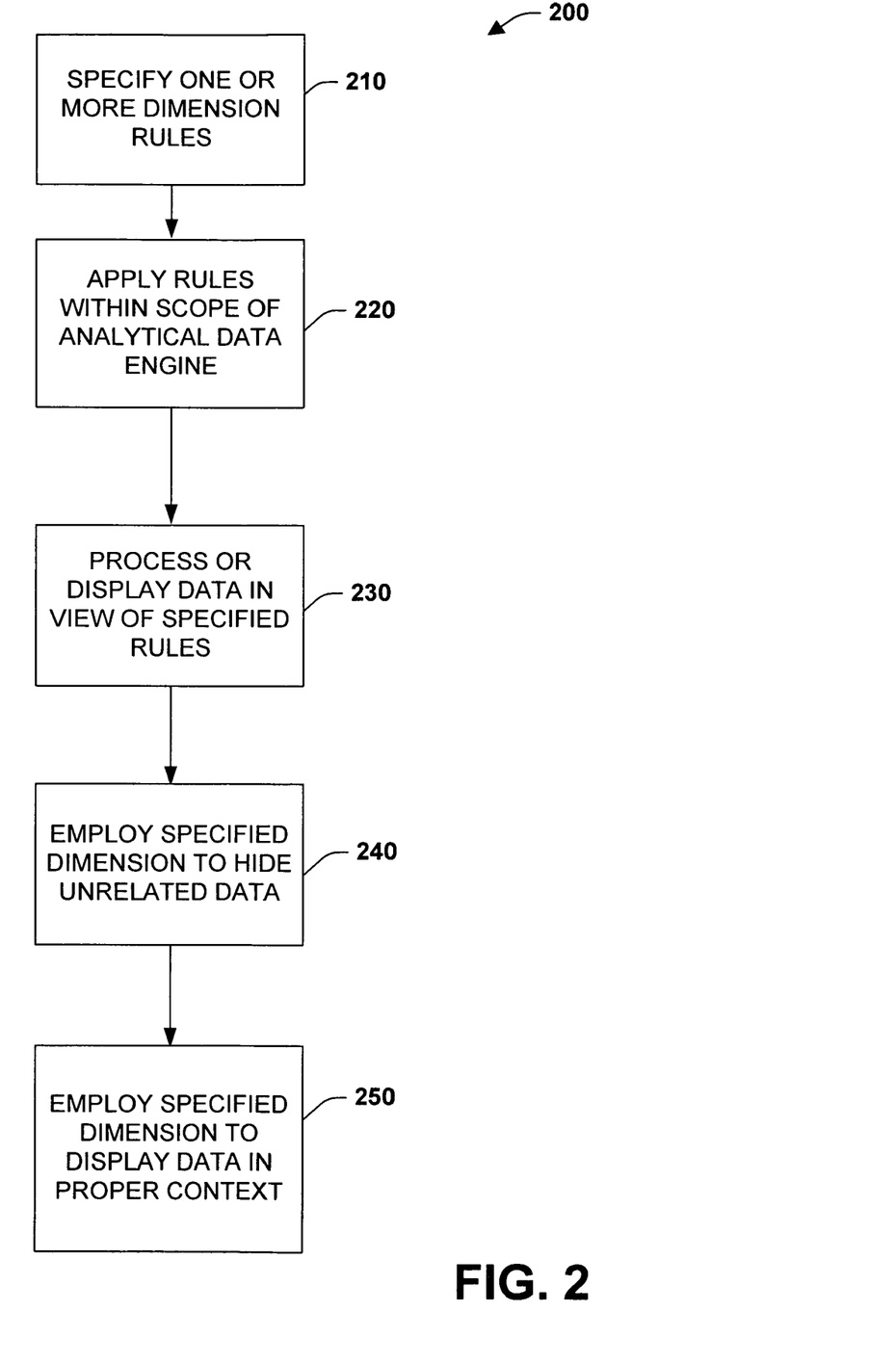
FIG. 2 is a flow diagram that illustrates a data analysis process.

FIG. 2 illustrates an exemplary process 200 for processing and analyzing data. While, for purposes of simplicity of explanation, the processes are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 200, one or more dimension rules are specified where the rule describes how data is to be processed and analyzed with respect to a particular users perspective and/or with respect to the impact on one dimension of data as another dimension is varied or changed. As noted above, dimension relationships can be specified between one dimension to one or more other dimensions, or relationships can be specified or defined between a dimension subset with respect to at least one other dimension subset or group of dimensions. At 220, the rules specified at 210 are applied within the scope of an analytical data engine. Such engine could be a data modeling component or applied as an online analytical processing tool. At 230, data is processed or displayed in view of the specified rules. For example, if time is specified as a varying dimension, data can be displayed before and after a respective date or time has occurred as will be illustrated in the example below with respect to FIG. 3.

Proceeding to 240, in one case, the specified rules may be employed to hide or mask data that is not relevant to a given user's data perspective. For instance, in an organization, one user may only be concerned with elements A, B, and C of the organization and thus, elements D and E would be masked or hidden from such view. At 250, the specified dimension may be employed to display data in its proper context to the user. Using the above example, the user associated with elements A, B, and C could be given data modeling and data output that is related or defined to those particular elements, thus, the user would see data and its associated context with respect to the user associated with A, B, and C. In another example, elements A and B may be specified with respect to time, where elements C and D become relevant at some later time or with respect to another qualifying dimension.

Figure 3:
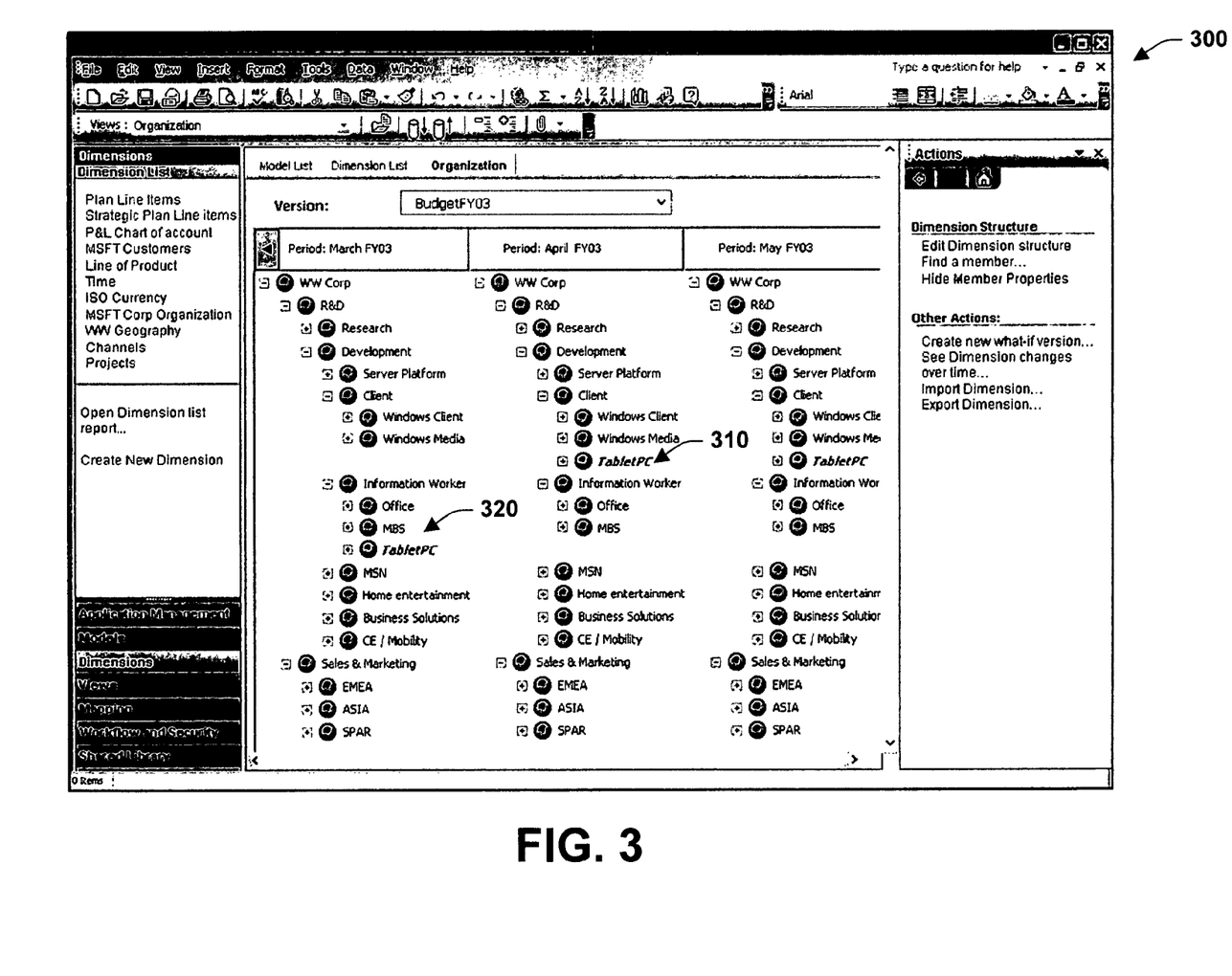
FIG. 3 is illustrates an example user interface that exemplifies displayed data with respect to a specified dimension relationship.

Referring to FIG. 3, an example user interface 300 exemplifies displayed data with respect to a specified dimension relationship. In this example 300, a Tablet PC division is reorganized below a Client division as of AprilFY03 as illustrated at 310. As a result, the user expects to see the Tablet PC under its previous classification e.g., the Information Worker division until then at 320 and under the Client division thereafter. As can be appreciated, a plurality of such data displays can be provided based on different and varying dimensions.

Figure 4:
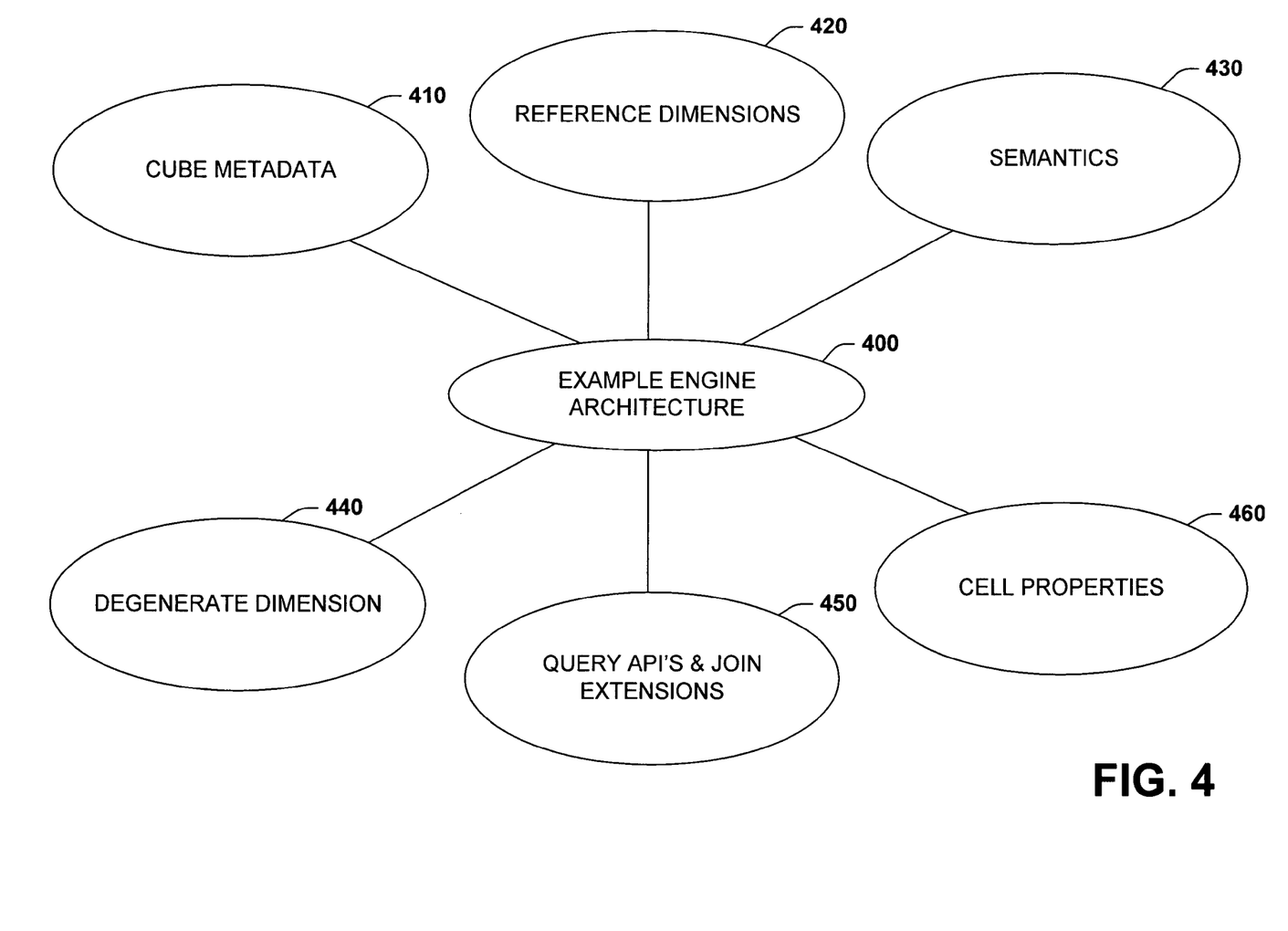
FIG. 4 illustrates an example engine architecture for processing and viewing data.

Turning to FIG. 4, an example engine architecture 400 is illustrated for processing and viewing data. In one aspect, the architecture 400 allows a new "cross-varying dimensions" feature that refines the concept of a cube dimension, moving various semantic characteristics implied by dimensional structure into separate model constructs, with each carrying the appropriate level of abstraction and flexibility for the end-user. More specifically, a dimension "auto-exist" feature can be provided by an Sequential Query Language (SQL) tool that is generalized from attributes in a single dimension to attributes in several associated "cross-varying" dimensions (one of them being a Time dimension, for example), with corresponding additions and changes. At 410, cube metadata can be enhanced with new structures (e.g., "Dimension Correlations"), each of which specifies a collection of two or more dimensions to be grouped together for purposes of determining member existence, together with a data binding identifying the source association/intersection many-to-many table which describes which members exist together. For a given cube, each dimension may generally participate in one Dimension Correlation.

At 420, reference dimensions can be processed as belonging to the same correlations as the base dimensions, with an implicit association table given by a many-to-one relationship between the reference dimension and the base dimension. This approach may also be applied with degenerate dimensions which are described below. At 430, semantic considerations may include auto-exists semantics (e.g., applied to tuple sets, for obtaining cell values, with a Where clause, and in the Exists function and Existing operator) which is extended to take into account cross-varying dimension restrictions (filtering by the associated correlation tables) in addition to intra-dimension auto-exists, and to also be applied between axes of a query (rows, columns, and so forth). As a consequence, this mitigates the possibility that users mistakenly associate calculation values (or attempt to write back) to invalid member combinations in cross-varying dimensions.

At 440, "degenerate dimensions" are considered where previous implementations can be reused and extended to become part of the cross-varying dimensions implementation described herein. At 450, Storage Engine query APIs and join algorithms can be extended to allow for efficient querying of several dimensions at once, resolving correlation restrictions in a single logical step to facilitate appropriate performance. This can be performed by querying the entities (correlation tables and dimensions) with highest filter selectivity (to be determined by using statistics and a cost-based heuristic), using the results to query the remaining entities (other dimensions and correlation tables) and then perform a hash join to produce the final result. An application programming interface (API) can be provided to be used by a Query Processor for "auto-exists" operations on tuple sets, as well as for obtaining cell iterators while evaluating cube calculations.

At 460, a new cell property can be added in order to allow client applications to be aware of which of the cells being queried no longer exist (i.e., are restricted/eliminated) due to cross-varying dimensions restrictions. This cell property can be used by client applications for user interface (UI) presentation layer purposes (custom formatting and display), and write back decisions.

Figure 5:
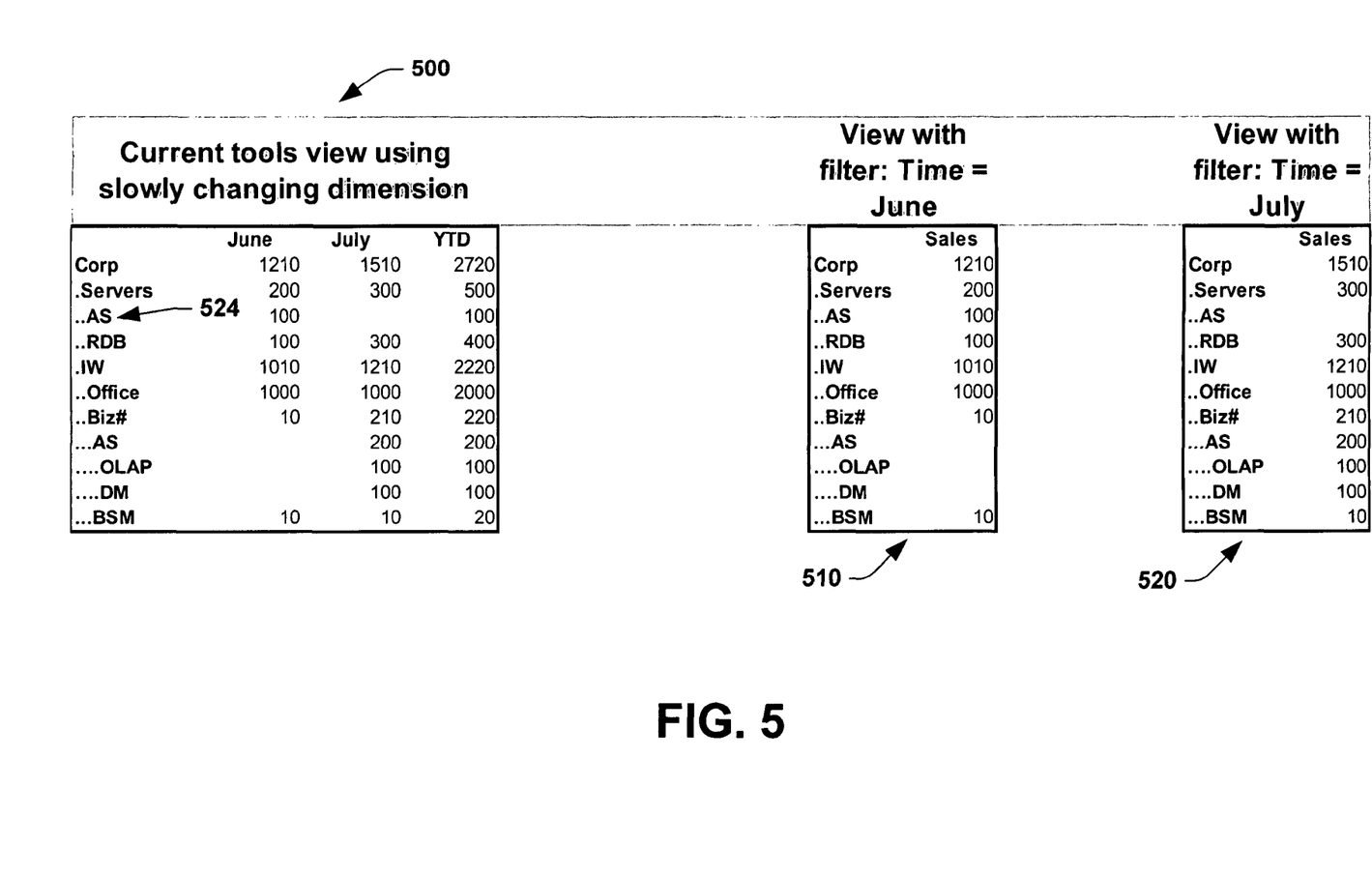
FIG. 5 illustrates a current data view without dimension versioning viewing support.
Figure 6:
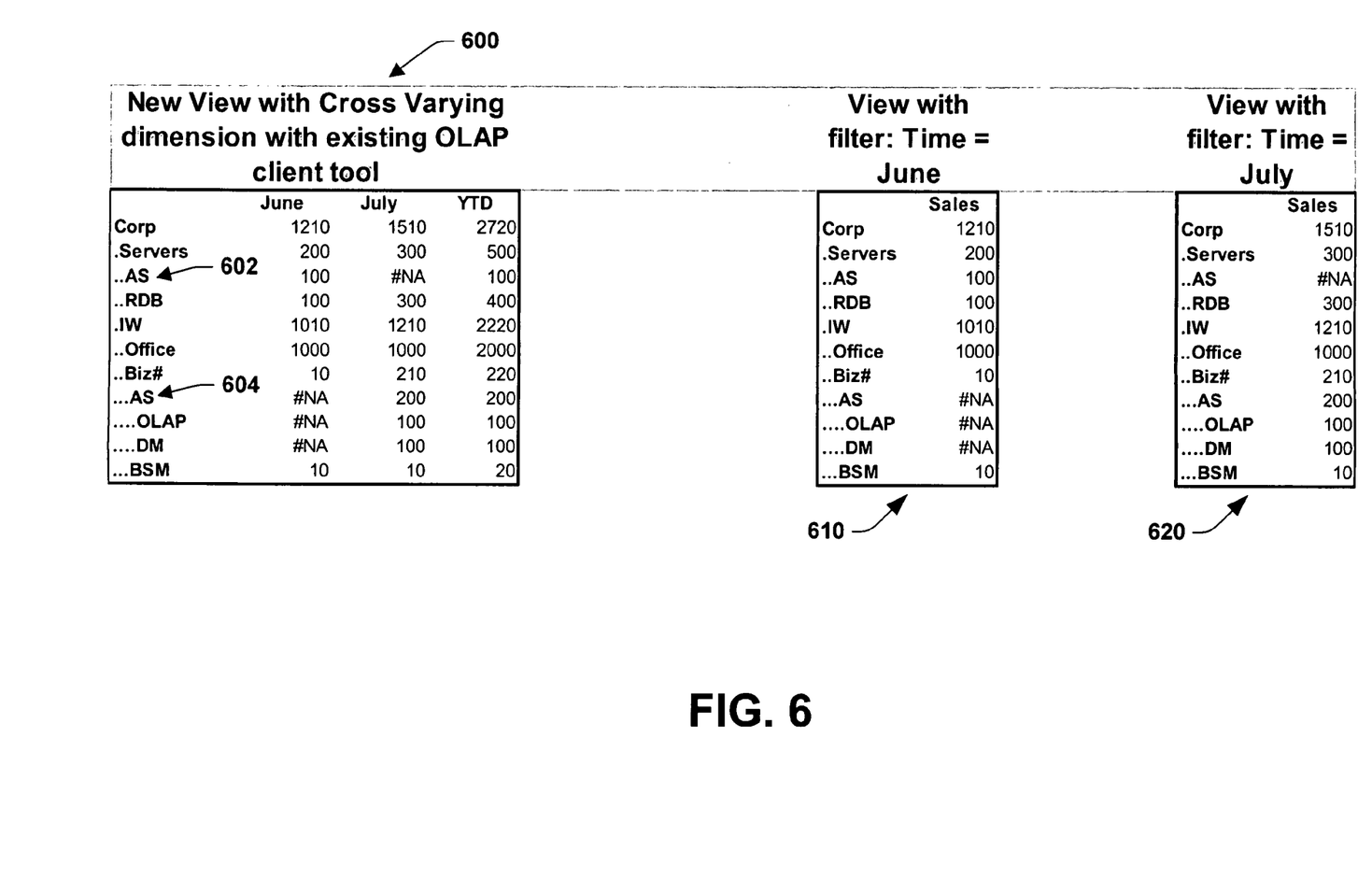
FIG. 6 illustrates an example of an enhanced data view having no special dimension versioning viewing support.
Figure 7:
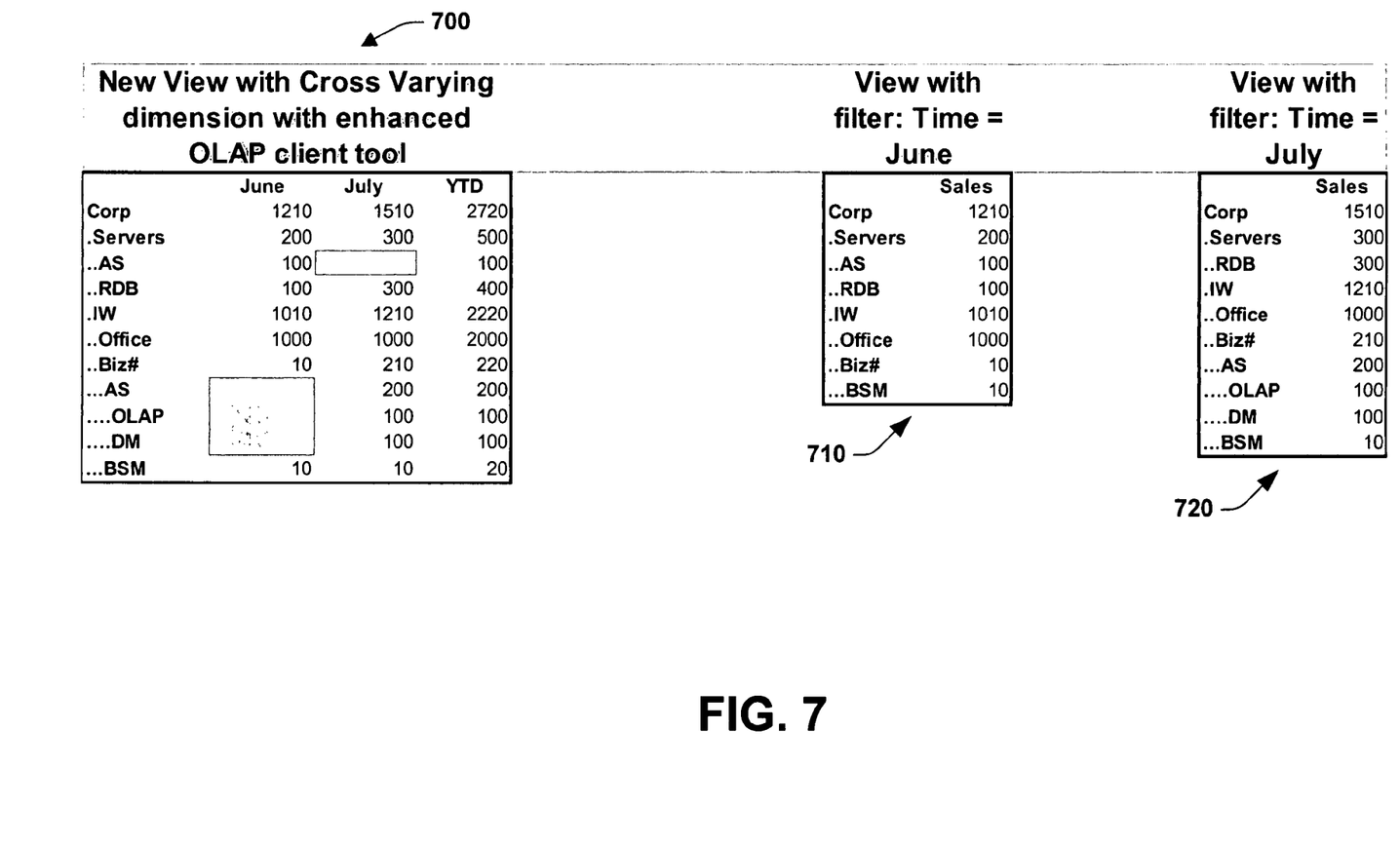
FIG. 7 illustrates an example of an alternative enhanced data view having some dimension versioning viewing support.
Figure 8:
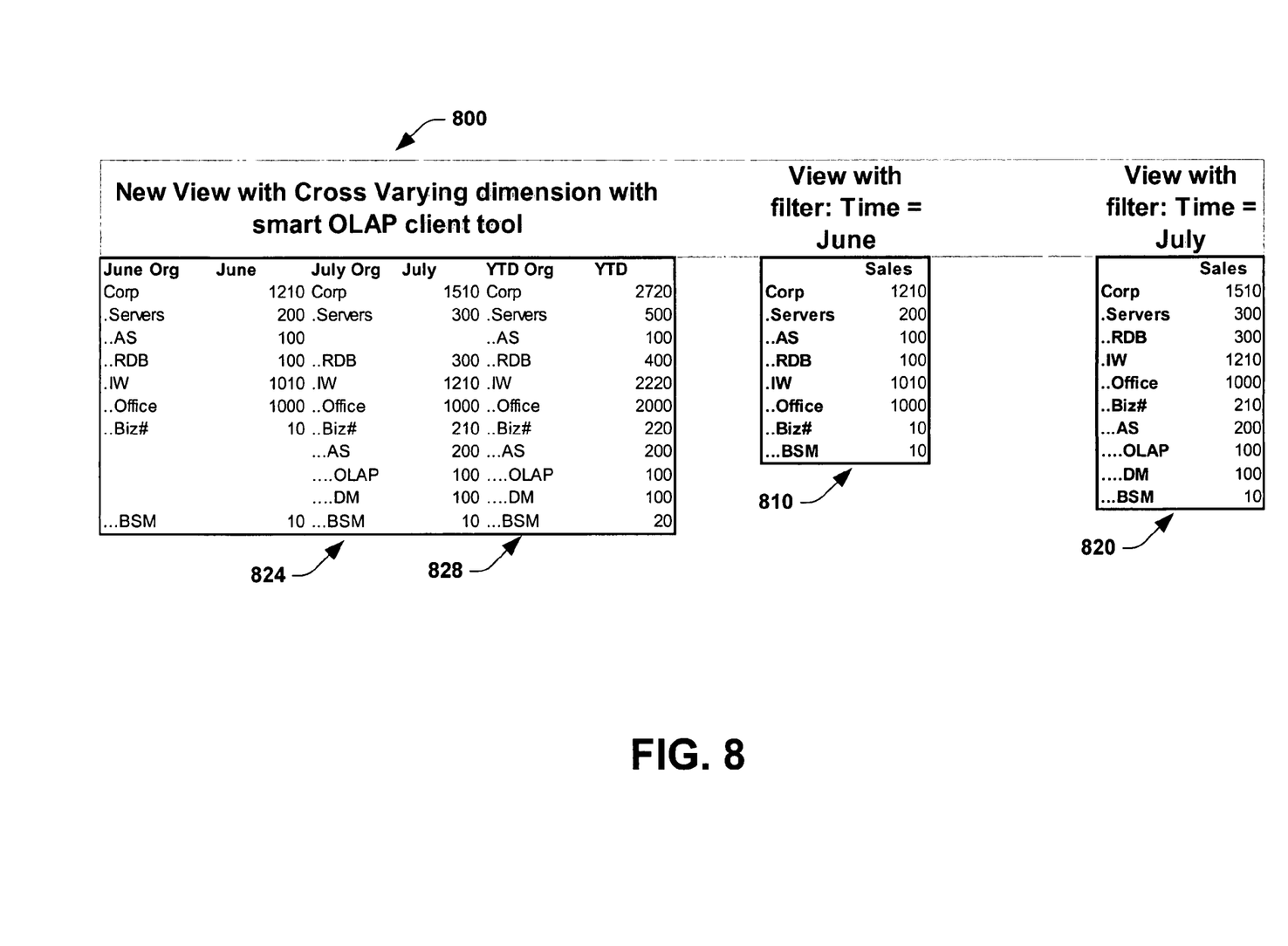
FIG. 8 illustrates an example of an alternative enhanced data view having full dimension versioning viewing support.

FIG. 5 illustrates a current data view 500 without dimension viewing support. In this case, data from June and July is filtered for output display at 510 and 520 but members appear (AS member for example at 524) redundantly in several location in the organization regardless of the June or July filter. FIG. 6 illustrates an example of an enhanced data view 600 having dimension viewing support. An AS member still appears twice at 602 and 604 but now an #NA message appears wherever the data intersection is invalidated by the cross varying dimension rules described above. In this example 600, fields in the main data set are assigned the value not applicable or #NA. As shown in filtered views for June and July at 610 and 620 respectively, the value of #NA is displayed in the respective fields. FIG. 7 illustrates an example of an alternative enhanced data view 700 having some optimized dimension viewing support. In this example, unknown data values are colored or indicated as "blank" and the respective filter views at 710 and 720 have eliminated such blank or non-applicable data fields from the user's view of the data. FIG. 8 illustrates an example of an alternative enhanced data view 800 having full dimension viewing support. In this example, data that is missing from the underlying aggregate of all data at 800 has been removed from the filtered views at 810 and 820. It is noted that the member hierarchy at 824 and 828 appears next to the data in the full view with its respective version for each month.

Figure 9:
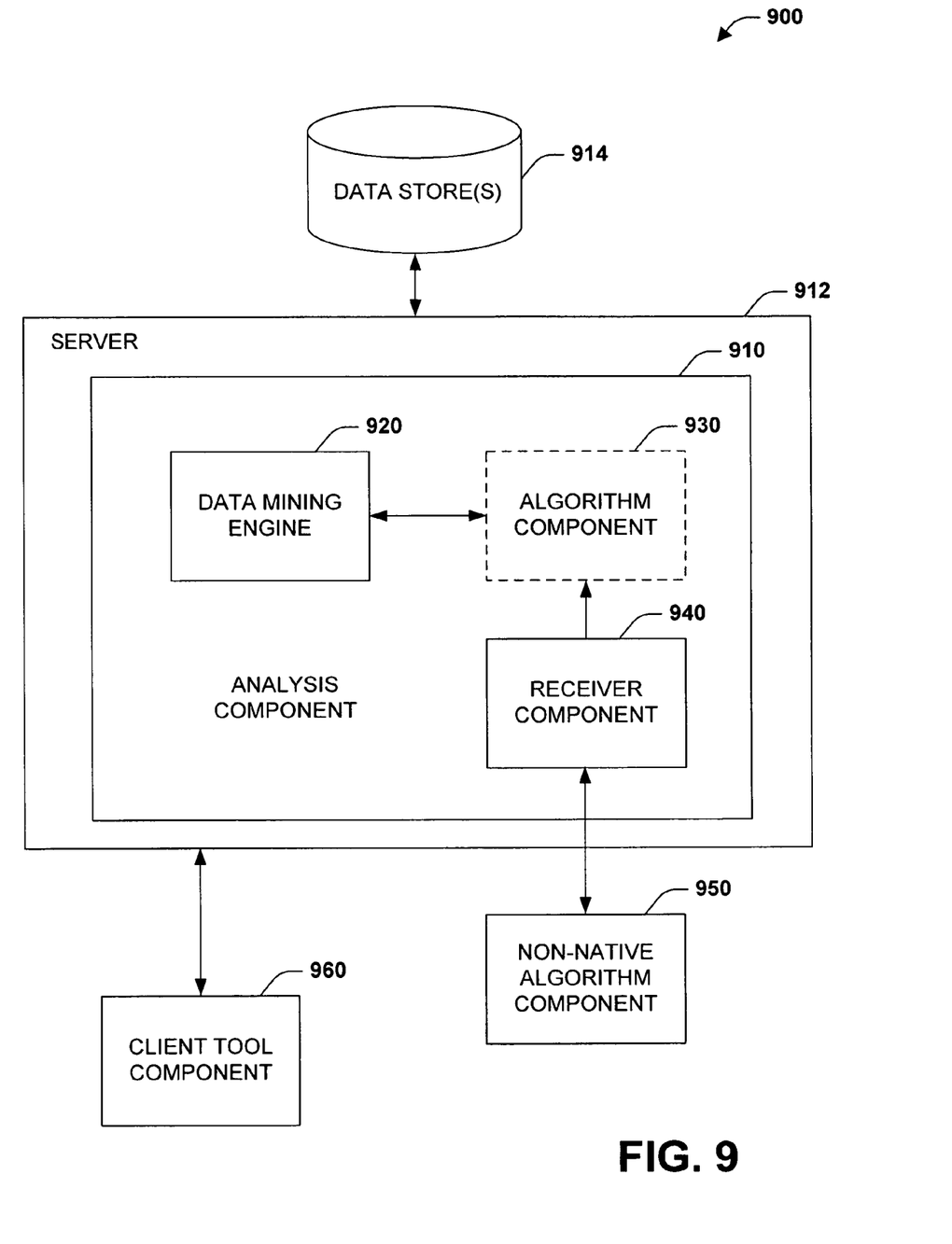
FIG. 9 illustrates an example data mining or data processing system.

Turning to FIG. 9, an example data mining, modeling and/or processing system 900 is depicted that can be applied in conjunction with the analytical components described above. System 900 provides a platform or framework to support, among other aspects, plug-in of or more mining or analytical algorithms. System 900 includes an analysis component 1910 that provides services or mechanisms for analyzing data. Analysis component 910 can be included as part of a larger system 912 such as a server, for example, a data mining server, analysis server, a database server or database management system 912 comprising hardware, software or a combination thereof that manages and facilitates interaction with data stored on one or more data stores 914 (e.g., relational, multidimensional, object-oriented, hybrid . . . ).

Analysis component 910 includes a data-mining engine 940 (or analysis engine). Data mining engine 940 includes components, mechanisms, systems and/or services to enable mining or processing of data. For example, mining engine 920 can employ a data-mining algorithm to discover rules and/or patterns with respect to a first set of data. Mining engine 920 can subsequently generate a data-mining model (DMM) that can be utilized to analyze a second set of data. For instance, predictions can be made or data classified, inter alia. Data mining engine 920 may include or otherwise be communicatively coupled to one or more native or built-in mining algorithms 930 such as those implementing decision trees, naïve Bayesian, clustering, association rules, neural network, time series, or support vector machines. However, such algorithms 930 may be suitable for general employment rather than specific to a particular problem. Alternatively, the built-in algorithms 930 may not employ a particular data mining technique or analysis algorithm. Consequently, it may be desirous to enable the data mining engine to employ other algorithms perhaps developed by research or industry (e.g., niche vendors). Accordingly, analysis component 910 can also include a receiver component 940.

Receiver component 940 receives, retrieves or otherwise obtains a non-native algorithm component 950. Non-native algorithm component 950 corresponds to an electronic version or representation of a data-mining algorithm that was not initially built in or provided by a system. Hence, the algorithm component 930 can be developed, for example, by researchers, academics, or other third parties like niche vendors for particular problem spaces. Such an algorithm can be introduced or plugged to the system or server 912 and analysis component 910 from a client via receiver component 940. Furthermore, receiver component 940 can facilitate saving and registering the algorithm such that it can be employed by data mining engine 920 to generate a data mining model, among other things. The algorithm can be saved to data store 914 and registered in a registry also stored on data store 914.

When plugged in, the non-native algorithm component 950 can be employed just as if it were a native or built-in algorithm. Accordingly, the algorithm component 930 can employ one or more server or database management services or mechanisms, which frees algorithm developers from having to implement them. For example, for training of a data mining model states, numbers, or other data can be formatted in a manner to facilitate comprehension or understanding by the algorithm for instance by tokenizing the data. In addition, support can be provided for querying or utilizing a mining model, for instance by a parser. Further, infrastructure is supplied for storing and managing access to a data-mining model or object. In particular, support can be provided to limit or secure access, supply concurrent access to a model by a plurality of users, manage transactions, and back up and restore, among other things. Moreover, the tight integration of non-native algorithm component(s) 950 enables them to take advantage of future additions to a system such as server 912 or management services associated therewith.

The system 900 can be provided as an extensible data mining or analysis system to support additional view components (not shown). System 900 in addition to the data-mining engine 920 can include a client tool component 960. Data-mining engine 920 can employ the data-mining algorithm 930 that analyzes stored data and produces a data-mining model identifying rules and/or patterns in data. The data-mining engine 920 can subsequently utilize this model to predict and/or classify, among other things, newly received data. Often, users desire to view the generated model. The learned model content can be displayed by viewers or graphical user interfaces (GUIs) that are customized for a mining algorithm employed to generate a data-mining model.

Client tool component 960 can be a mechanism to facilitate interaction with data mining data and/or information. For example, client tool component 960 could be a design, development, and/or workbench environment or system. Client tool component 960 can include one or more native viewer components (not shown), for example provided by the client tool vendor. Such viewers can be employed to view mining model content generated by particular data mining algorithms. Client tool component 960 can also include a viewer receiver component that can receive, retrieve or otherwise obtain one or more non-native viewer components, for instance provided by clients, users, or third party vendors. The receiver component 940 can then save the non-native viewer component to facilitate future employment. Furthermore, the receiver component 940 may register the viewer component with the client tool component 960 and/or the data-mining engine 920 to identify its presence and availability. For example, the receiver component 940 may register the name and location of the viewer component assembly as well as the compatible data mining algorithms and a display name.

The data-mining engine 920 can interact with client tool component 960 such that a non-native viewer component or an instance thereof can be invoked. For instance, the data-mining engine 920 can transmit information to the client tool component 960 pertaining to the algorithm utilized to generate a model sought to be viewed or displayed. Where a data mining algorithm has more than one viewer capable of displaying a model, the names of the available viewer components can be presented to a user, for instance in a drop down list, for selection, for example in a data mining wizard provided by the client tool component 960. It should be appreciated that the non-native viewer component that is plugged in to the client tool component 960 can display models associated with built-in or non-native plug-in data mining algorithms. For example, a custom viewer could be designed and plugged in to the client tool component 960 to display a model generated by a built-in or native data-mining algorithm in a different or more enhanced manner. Additionally or alternatively, a non-native viewer component could be added or plugged-in to support display of a model generated by a non-native data-mining algorithm that was added or plugged in to the data-mining engine 920 or newly associated therewith.

Data mining engine 920 may include one or more engine interface components (not shown) that can be utilized or consumed by viewer components. Similarly, viewer components may include one or more viewer interface components that may be utilized or consumed by data mining engine 920 to support interaction and ultimately display via viewer component. By way of example and not limitation, the viewer component may be required to include or implement an interface to a pluggable viewer component. Other interfaces could be for Display Name for displaying the name of the viewer, Service Provider and Connection String to facilitate connection to the mining engine view a specified string, Model Name to return the name models supported, as well as viewer data. A load data interface method can be called when the viewer component is asked to render a model. In such an interface, a method is generally provided that connects to the server, loads the content of the model and renders the content. Various other interfaces may be required or optional.

Figure 10:
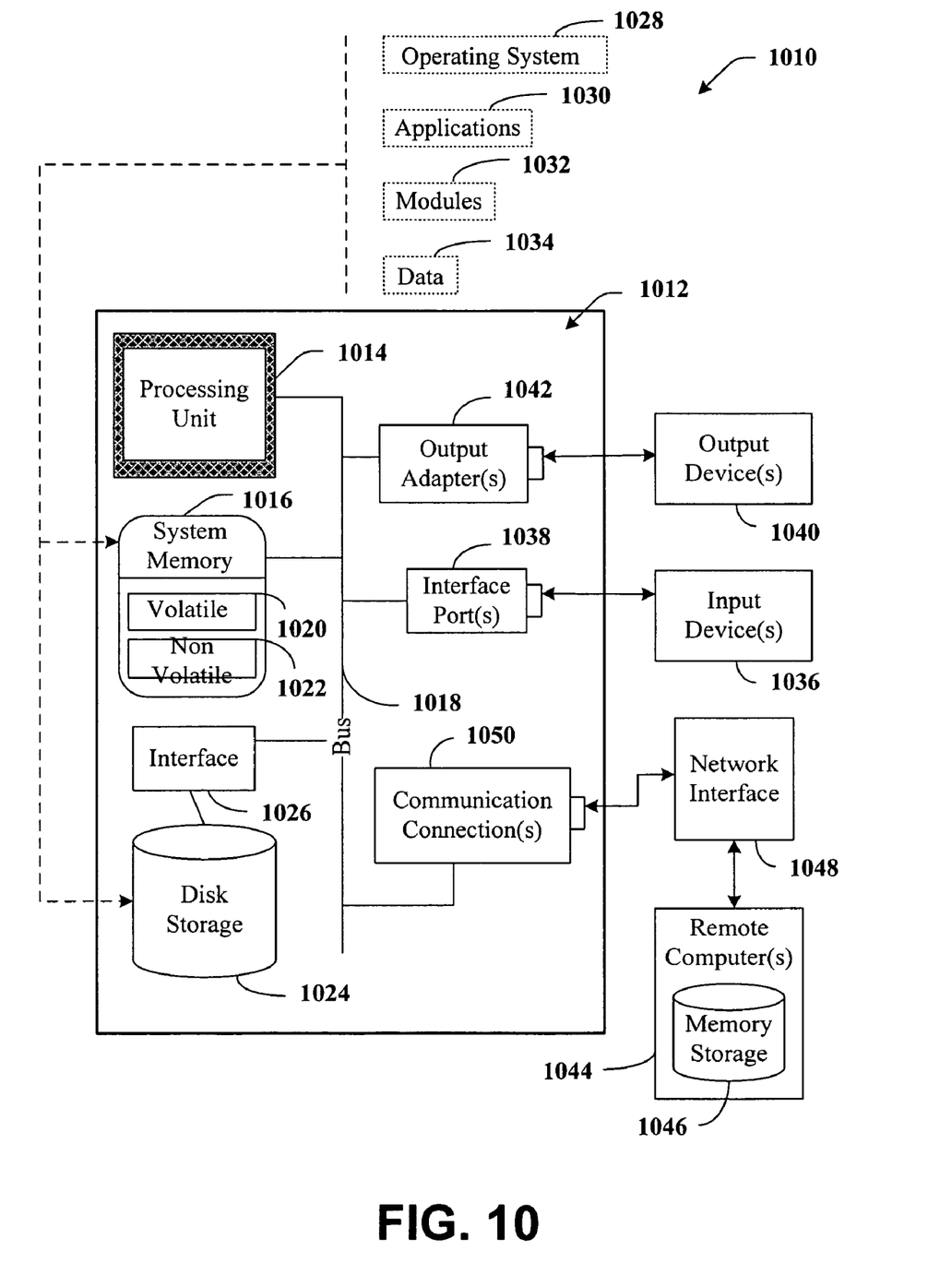
FIG. 10 is a schematic block diagram illustrating a suitable operating environment.
Figure 11:
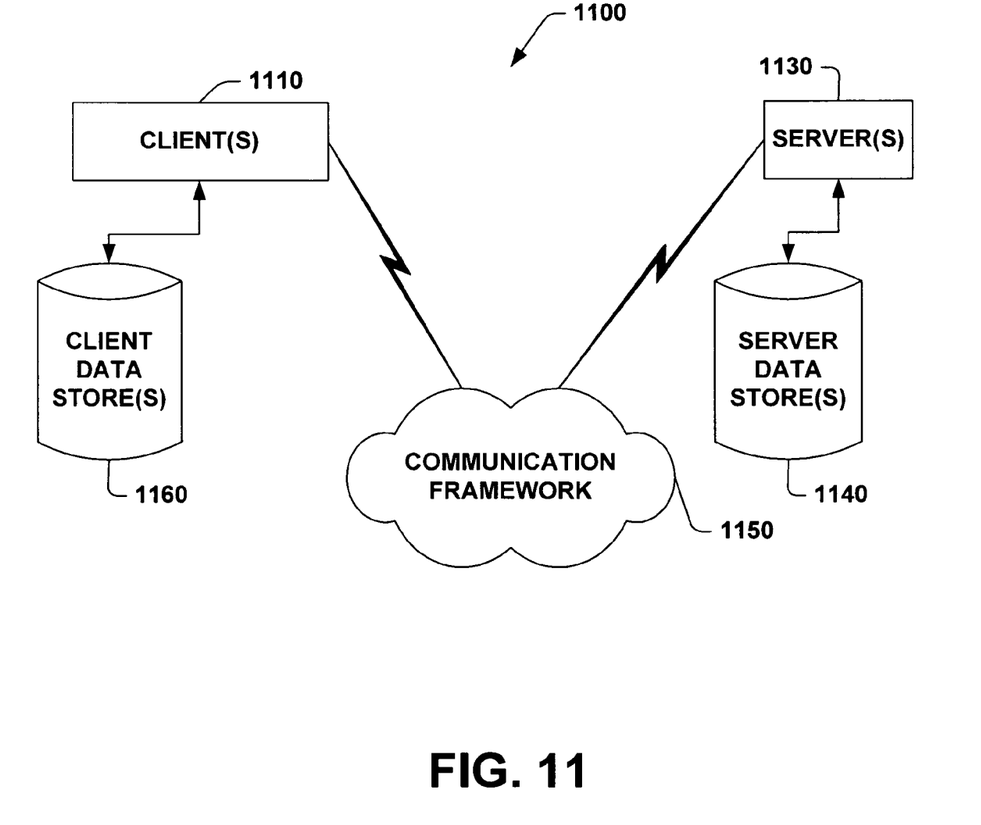
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects described herein includes a computer 1012. The computer 1012 includes a processing unit 1014, a system memory 1016, and a system bus 1018. The system bus 1018 couple system components including, but not limited to, the system memory 1016 to the processing unit 1014. The processing unit 1014 can be any of various available processors. Dual microprocessors and other multi-processor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data processing and analysis system for applying one or more relationships between a first dimension of data and at least one other dimension of data, the system comprising:
   one or more processors upon which executes computer executable components comprising:
   an analysis engine that comprises a data-mining engine and a rules component and queries one or more components of data;
   a graphical user interface which accepts queries submitted to the analysis engine, which accepts rules specified for the rules component, accepts a query for varying multiple versions of a first dimension based upon members of a second dimension, and displays based upon the query and rules specified for each of the first and second dimensions;
   wherein the rules component:
   accepts input to enable specification of a plurality of data dimensions, the data dimensions comprising reference dimensions, base dimensions, and degenerate dimensions and the specifications defining one or more relationships between at least two of the plurality of data dimensions;
   accepts input to define a relationship which defines how the first dimension varies based upon the second dimension;
   defines rules that describe how data in the plurality of dimensions is to be processed and analyzed with respect to a data perspective and how, according to the defined relationship, data being varied in the second dimension impacts the first dimension.

2. The system of claim 1, the analysis engine is an online analytical processing component.

3. The system of claim 1, further comprising a graphical user interface to specify the relationship and view the data.

4. The system of claim 1, the data is associated with one or more cubes of data.

5. The system of claim 1, the rules component applies one or more rules between dimensions, between one dimension and a subset of dimensions, or between one dimension subset and one or more other dimension subsets.

6. The system of claim 1, further comprising at least one data model to facilitate data analysis.

7. The system of claim 1, wherein the first dimension is a time dimension.

8. The system of claim 1, further comprising a component allowing a user to define which members of a dimension are valid for a specific entity or which combination of tuples are valid for a specific entity.

9. The system of claim 1, further comprising a filter component to display filtered views of a data set.

10. The system of claim 1, further comprising a business or a database application to interact with the analysis engine.

11. The system of claim 10, the analysis engine enables at least one of: moving entities; splitting entities; merging entities; ceasing entity activities; starting a business division; acquiring a new entity; changing percentage of ownership; or changing owners of a business.

12. The system of claim 1, further comprising a computer readable medium having computer executable instructions stored thereon to execute the analysis engine or the rules component.

13. A method for data processing and analytical modeling, comprising:
  employing a processor to execute the following computer executable analytical modeling acts:
    executing a data-mining algorithm to discover rules and patterns with respect to a first set of data;
    generating from the discovered rules and patterns a data-mining model identifying the rules and patterns which can be utilized to analyze a second set of data;
    defining one or more dimension rules for a third data set, wherein the rules describe how data is to be processed and analyzed with respect to a data dimension and how data being varied in one dimension impacts another dimension;
    applying the dimension rules to at least one dimension of the third data set;
    processing multiple dimensions of the third data set in view of the dimension rules;
    receiving a non-native data-mining algorithm component;
    displaying a graphical user interface which accepts queries submitted for an analysis engine, which accepts dimension rules correlating the first and second set of data, which accepts a query for varying multiple versions of a first dimension based upon members of a second dimension, and which comprises a data view having dimension viewing support for displaying the first set of data;
    masking data that is not relevant to the data perspective; and
    displaying data that is not masked and which has been processed by the data-mining algorithm and the non-native data-mining algorithm.

14. The method of claim 13, further comprising processing one or more items of cube metadata including determining a source association intersection.

15. The method of claim 13, further comprising determining one or more reference dimensions having at least one implicit association to a table.

16. The method of claim 13, further comprising processing one or more semantic instructions that are applied between at least one axis of a query.

17. The method of claim 13, further comprising extending one or more degenerate dimensions in addition to at least one cross varying dimension.

18. The method of claim 13, further comprising:
  querying at least one entity with highest filter selectivity, the filter selectivity is determined using statistics as a cost-balanced heuristic;
  using results from the query of the at least one entity with highest filter selectivity to query remaining entities; and
  performing a hash join to produce final query results.

19. The method of claim 13, further comprising generating at least one additional cell to notify client applications of missing cells.

* * * * *